(12) United States Patent
Kennedy et al.

(10) Patent No.: US 11,016,311 B2
(45) Date of Patent: *May 25, 2021

(54) RIGID, GAS-PERMEABLE POLYMER AS OVER-MOLD AND SEALANT FOR ADAPTIVE OPTHALMIC LENS

(71) Applicant: Verily Life Sciences LLC, South San Francisco, CA (US)

(72) Inventors: Scott Kennedy, Mountain View, CA (US); Jeremy Emken, Belmont, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,519

(22) Filed: Jun. 26, 2020

(65) Prior Publication Data
US 2020/0326561 A1    Oct. 15, 2020

Related U.S. Application Data

(60) Continuation of application No. 16/440,699, filed on Jun. 13, 2019, now Pat. No. 10,718,958, which is a
(Continued)

(51) Int. Cl.
*G02C 7/04* (2006.01)
*B29D 11/00* (2006.01)
(Continued)

(52) U.S. Cl.
CPC ........ *G02C 7/041* (2013.01); *B29D 11/00817* (2013.01); *G02C 7/022* (2013.01);
(Continued)

(58) Field of Classification Search
CPC ........ G02C 7/041; G02C 7/081; G02C 7/022; G02C 7/083; G02C 2202/06
See application file for complete search history.

(56) References Cited

U.S. PATENT DOCUMENTS

| 4,166,255 A | 8/1979 | Graham |
| 10,718,958 B2 * | 7/2020 | Kennedy ................ G02C 7/041 |

(Continued)

OTHER PUBLICATIONS

PCT/US2017/052815—International Search Report and Written Opinion of the International Searching Authority, dated Dec. 22, 2017, 16 pages.
(Continued)

*Primary Examiner* — Jessica M Merlin
(74) *Attorney, Agent, or Firm* — Christensen O'Connor Johnson Kindness PLLC (57) ABSTRACT

An eye-mountable device is provided that includes electronics encapsulated within a rigid, gas-permeable polymeric material. The eye-mountable device includes an electroactive lens that can be operated to control an overall optical power of the eye-mountable device to restore an amount of visual accommodation of an eye to which the device is mounted. A method for fabricating the eye-mountable device is provided that includes applying an adhesive to secure lenses of the electroactive lens together and to maintain an amount of liquid crystal in the space between the lenses. The rigid, gas-permeable polymeric material can then be formed around the electroactive lens, electronics, or other elements of the eye-mountable device. The rigid, gas-permeable polymeric material can be mountable to a corneal surface of an eye or can be disposed on or within a soft polymeric material that is mountable to the corneal surface of the eye.

11 Claims, 8 Drawing Sheets

Related U.S. Application Data division of application No. 15/275,271, filed on Sep. 23, 2016, now Pat. No. 10,365,504.

(51) Int. Cl.
  *G02C 7/08* (2006.01)
  *G02C 7/02* (2006.01)

(52) U.S. Cl.
  CPC ............... *G02C 7/04* (2013.01); *G02C 7/083* (2013.01); *G02C 2202/08* (2013.01)

(56) References Cited

U.S. PATENT DOCUMENTS

| | | |
|---|---|---|
| 2004/0027536 A1 | 2/2004 | Blum et al. |
| 2011/0114517 A1 | 5/2011 | Minick et al. |
| 2014/0192313 A1 | 7/2014 | Riall et al. |
| 2014/0276481 A1 | 9/2014 | Pugh et al. |
| 2015/0005602 A1 | 1/2015 | Linhardt et al. |
| 2015/0077658 A1 | 3/2015 | Pugh et al. |
| 2015/0077662 A1 | 3/2015 | Pugh et al. |
| 2015/0362754 A1 | 12/2015 | Etzkorn et al. |
| 2016/0276678 A1 | 9/2016 | Jorgensen et al. |

OTHER PUBLICATIONS

Chinese Office Action, dated Sep. 30, 2020 for corresponding Chinese Patent Application No. 201780065608.4, 10 pages.
Chinese Office Action, dated Mar. 1, 2021 for corresponding Chinese Patent Application No. 201780065608.4, 8 pages.

\* cited by examiner

RIGID, GAS-PERMEABLE POLYMER AS OVER-MOLD AND SEALANT FOR ADAPTIVE OPTHALMIC LENS

CROSS-REFERENCE TO RELATED APPLICATIONS

This application is a continuation of U.S. application Ser. No. 16/440,699, filed Jun. 13, 2019, which is a divisional of U.S. application Ser. No. 15/275,271, filed Sep. 23, 2016, the contents both of which are incorporated herein by reference.

BACKGROUND

Unless otherwise indicated herein, the materials described in this section are not prior art to the claims in this application and are not admitted to be prior art by inclusion in this section.

An eye-mountable device may include sensors, actuated lenses, electronics, or other components configured to provide a controllable optical power, to obtain health-related information (e.g., based on a flow rate or level of oxygenation of blood in vasculature of an eye), or to provide some other functionality to a user wearing the eye-mountable device. Such an eye-mountable device may include a sensor apparatus configured to detect physiological properties of a wearer and/or properties of the environment of a wearer. Additionally or alternatively, such an eye-mountable device may include a liquid crystal lens, electrowetting lens, or some other type of actuated lens to provide a controllable optical power to an eye. In some examples, the eye-mountable device may be in the form of a contact lens that includes a sensor apparatus configured to detect a property of interest.

SUMMARY

Some embodiments of the present disclosure provide a method including: (i) forming an electroactive lens assembly, wherein the electroactive lens assembly includes an amount of liquid crystal disposed between a first lens and a second lens, and wherein the electroactive lens assembly includes first and second electrodes to which voltage can be applied to alter an optical power of the electroactive lens assembly; (ii) applying an adhesive to the electroactive lens assembly, wherein the applied adhesive contacts the first lens and the second lens such that the amount of liquid crystal is contained within a combination of the first lens, the second lens, and the applied adhesive; (iii) electrically coupling the first and second electrodes of the electroactive lens assembly to an electronic circuit; (iv) disposing the electroactive lens assembly, the applied adhesive, and the electronic circuit within a precursor material; (v) curing the applied adhesive; and (vi) curing the precursor material to form a rigid, gas-permeable polymer layer, wherein the applied adhesive and the electronic circuit are fully encapsulated by a combination of the rigid, gas-permeable polymer layer and one or more lenses of the electroactive lens assembly.

Some embodiments of the present disclosure provide a device including: (i) an electroactive lens assembly, wherein the electroactive lens assembly includes an amount of liquid crystal disposed between a first lens and a second lens, and wherein the electroactive lens assembly includes first and second electrodes to which voltage can be applied to alter an optical power of the electroactive lens assembly; (ii) an electronic circuit, wherein the electronic circuit is electrically coupled to the first and second electrodes of the electroactive lens assembly; (iii) an adhesive, wherein the adhesive is adhered to the first lens and the second lens of the electroactive lens assembly, and wherein the liquid crystal is contained within a combination of the first lens, the second lens, and the adhesive; and (iv) a rigid, gas-permeable polymer layer, wherein the adhesive and the electronic circuit are fully encapsulated by a combination of the rigid, gas-permeable polymer layer and one or more lenses of the electroactive lens assembly.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

It can be beneficial in a variety of applications to be able to control the optical power (e.g., diopter, focal length) of a lens. For example, the ability to control the optical power of a contact lens or eyeglasses could allow such devices to compensate for a diminished or lost ability of a person's eye to naturally accommodate. Accommodation is a process by which the optical properties of a person's eye (e.g., the focal length of the crystalline lens of the eye) are controlled to allow the eye to focus on objects at different distances from the eye at different points in time. The ability of a person's eye to accommodate may be diminished by age, lost completely due to removal or the crystalline lens (e.g., as a result of cataract surgery), or diminished or lost due to some other procedure or process.

An actuated lens could have an optical power (e.g., a diopter, a focal length) that is controllable. The optical power of such an actuated lens could be mechanically controllable, e.g., by the application of a mechanical force or pressure to deform one or more refractive, reflective, or diffractive elements of the lens, by the application of a hydraulic or pneumatic pressure to change a volume or geometry of an element by adding or subtracting fluid from the volume or controlling a pressure of a fluid within the volume, or by exerting some other mechanical force(s) to control or change the optical power of the actuated lens. Additionally or alternatively, an actuated lens could be electronically controllable, e.g., by the application of an electrical or magnetic field to change an optical property of a material of the lens, by applying an electrical field or current to control the geometry of a volume of fluid within the lens, by applying an electrical field to control the reflectivity or opacity of one or more elements of the lens, or by exerting some other electrical field(s) or force(s) to control or change the optical power of the actuated lens. Such an electronically controllable actuated lens could be referred to as an electroactive lens.

An electroactive lens could include one or more volumes of a liquid crystal. An optical property (e.g., a refractive index) of the liquid crystal could be related to the electrical field (or to some other electromagnetic field or phenomenon) applied to the liquid crystal such that an overall optical power (e.g., a focal length) of the electroactive lens can be controlled by applying an electrical field (or other specified electromagnetic force, field, current, charge, or other phenomenon) to the liquid crystal of the electroactive lens, e.g., via electrodes of the electroactive lens. For example, a volume of the liquid crystal could be disposed between first and second lenses (e.g., lenses formed from a rigid, gas-permeable polymer) and two or more electrodes could be disposed on or within the lenses (e.g., by being formed from a transparent conductive material). The optical power of such an electroactive lens could be related to the geometry and refractive index of the lenses, the geometry of the volume of liquid crystal disposed between the lenses, and a magnitude or other properties of an electric field applied to the liquid crystal using the electrodes.

Such an electroactive lens could be incorporated into an eye-mountable device, such as a contact lens. In order to protect the liquid crystal of the electroactive lens and other elements (e.g., controllers, batteries, sensors, antennas, or other electronics) of such a contact lens from moisture or other substances (e.g., electrolytes, proteins) in the environment of an eye (or in some other environment of interest), these elements could be fully encapsulated within a layer of rigid, gas-permeable polymer or within some other encapsulating material. Forming such an encapsulating material layer could include disposing the electroactive lens and other elements (e.g., electronics) within a precursor material and curing the precursor material. In order to separate the liquid crystal from such a precursor material, to provide mechanical stability of the electroactive lens during assembly of a device including the electroactive lens, or to provide some other benefit, an adhesive could be applied before disposing the electroactive lens in the precursor material. Such an adhesive could be applied to the lenses of the electroactive lens and to contain one or more volumes of liquid crystal within a combination of the adhesive and the lenses. The applied adhesive could be dried or otherwise cured before disposing the electroactive lens within the precursor material (e.g., to mechanically secure the lenses or other elements of the electroactive lens together during assembly of a device). Alternatively, the adhesive could be immiscible with the precursor material and could be cured at the same time as the precursor material.

The entirety of the electroactive lens, as well as electronics or other elements (e.g., a substrate on which the electronics are disposed, traces or interconnects to electrically couple such electronics to electrodes or other elements of the electroactive lens) could be fully encapsulated within such a layer of encapsulating material. Alternatively, the liquid crystal of the electroactive lens and/or electronics, interconnects, or other elements of a device could be fully encapsulated within a combination of a layer of encapsulating material and one or more lenses of the electroactive lens. For example, a combination of a particular lens of the electroactive lens and the layer of encapsulating material could fully encapsulate one or more volumes of liquid crystal of the electroactive lens, an adhesive applied to the electroactive lens, other lenses of the electroactive lens, electronics, interconnects, or other elements of a device.

An electroactive lens as described herein could be used in a variety of applications or devices. As noted elsewhere herein, such an electroactive lens could be incorporated into a contact lens or other eye-mountable device. In such examples, another material (e.g., a soft hydrogel material) could be formed around the encapsulating polymeric material and could have a shape (e.g., by casting, by machining) specified to facilitate contact mounting to an eye. Additionally or alternatively, the encapsulating material could be cast and/or machined to have such an eye-mountable shape. In some examples, a device that includes an electroactive lens, electronics, and/or other elements encapsulated within a layer of polymeric material could be provided to contact lens manufacturers and/or to consumers to be disposed within a soft hydrogel contact lens or within some other formed eye-mountable material.

II. EXAMPLE EYE-MOUNTABLE DEVICE

An electroactive lens as described herein could be incorporated into an eye-mountable device. Such an eye-mountable device could additionally include an electronic apparatus (e.g., one or more sensors, controllers, batteries, antennas, or other elements) that, along with the electroactive lens, is encapsulated within a rigid, gas permeable polymer layer or within some other encapsulating material. Such encapsulation could provide protection and/or structure to the lens and electronic apparatus, an overall shape or external mounting surface of the eye-mountable device, and/or some other benefit. An eye-mountable device including an electroactive lens can be configured or operated to provide a controllable optical power to an eye and/or some other applications (e.g., sensing a level of blood oxygenation or other physiological parameters of a wearer, detecting blinks or other user inputs or actions, providing power to a device implanted within an eye).

A rigid, gas-permeable polymer layer (or other encapsulating material) within which elements of an electroactive lens (one or more lenses, electrodes, and/or volumes of liquid crystal), electronics, interconnects, and/or other components are encapsulated could be formed to be removably mounted directly to an eye in a manner that is compatible with eyelid motion (e.g., the rigid, gas permeable polymer layer could be formed as a rigid contact lens). Alternatively, such a rigid, gas permeable polymer layer could be embedded within some further encapsulating material (e.g., within a hydrogel or other soft or rigid polymer layer formed to mount to an eye) and/or could be formed to mount to or within a soft polymer layer that is configured to mount to an eye in combination with the rigid, gas permeable polymer layer containing the electroactive lens.

Figure 1A:
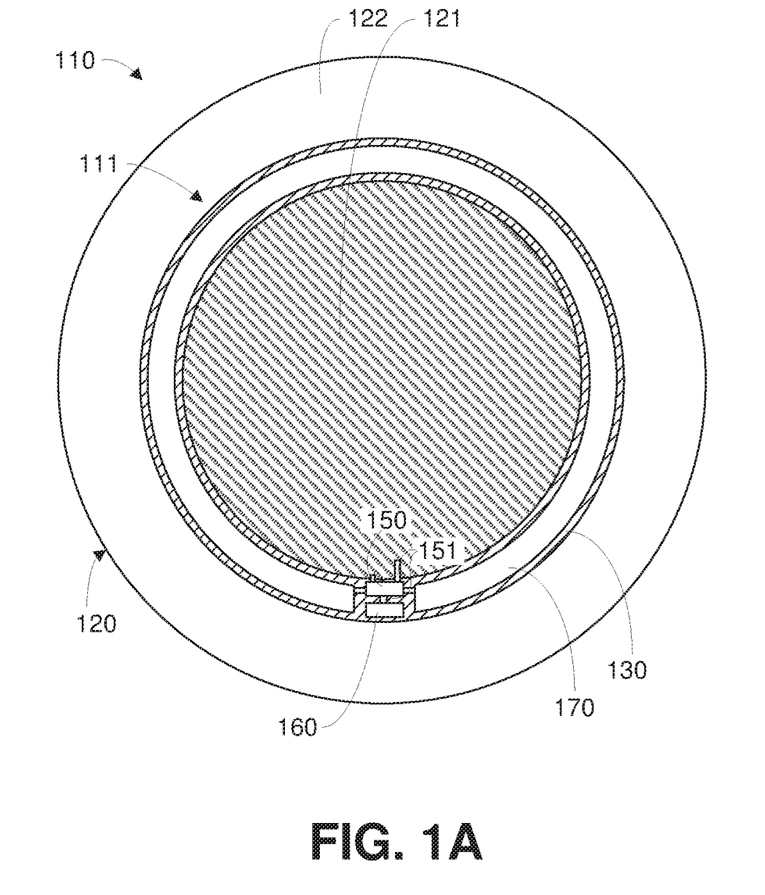
FIG. 1A is a top view of an example eye-mountable device.
Figure 1B:
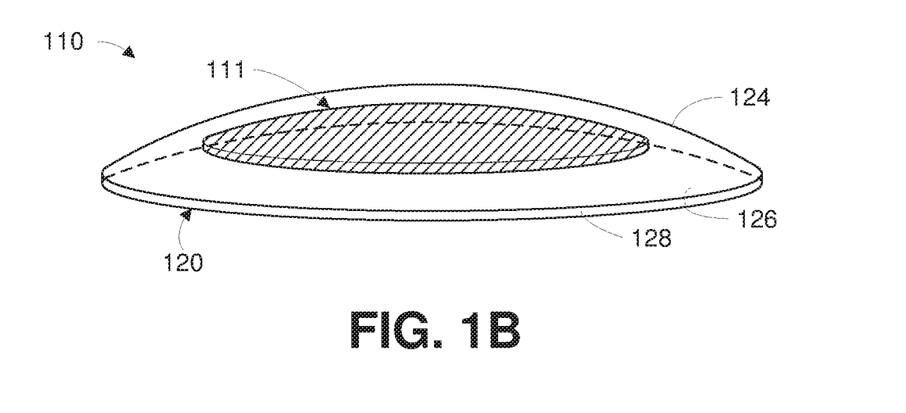
FIG. 1B is an aspect view of the example eye-mountable device shown in FIG. 1A.

FIG. 1A is a top view of an example eye-mountable electronic device 110. FIG. 1B is an aspect view of the example eye-mountable electronic device shown in FIG. 1A. It is noted that relative dimensions in FIGS. 1A and 1B are not necessarily to scale, but have been rendered for purposes of explanation only in describing the arrangement of the example eye-mountable electronic device 110. The eye-mountable device 110 includes a rigid, gas-permeable polymer layer 111 embedded within a soft polymer layer 120. One or more lenses, electrodes, and/or volumes of liquid crystal of an electroactive lens 121 and other components are fully encapsulated within the rigid, gas-permeable polymer layer 111.

The soft polymer layer 120 can be shaped as a curved disk. The soft polymer layer 120, rigid, gas-permeable polymer layer 111, elements (e.g., lenses, electrodes, liquid crystals) of the electroactive lens 121, or other components of the eye-mountable electronic device 110 can be composed of substantially transparent material(s) to allow incident light to be transmitted to the eye while the eye-mountable device 110 is mounted to the eye. The soft polymer layer 120 can be a biocompatible, oxygen-permeable material similar to those employed to form soft vision correction and/or cosmetic contact lenses in optometry, such as a silicone hydrogel. Additionally or alternatively, the rigid, gas-permeable polymer layer 111 and/or one or more lenses or other elements of the electroactive lens 121 could be composed of a biocompatible, oxygen-permeable material like silicone acrylate, fluoro-silicone acrylate, or some other rigid, gas-permeable polymers. The soft polymer layer 120, rigid, gas-permeable polymer layer 111 and/or one or more lenses or other elements of the electroactive lens 121 could include further compounds or materials to provide some functionality, e.g., to block ultraviolet light from being transmitted, through the eye-mountable device 110, to an eye. Further, the soft polymer layer 120 could include a surface coating configured to provide some functionality, e.g., a hydrophilic coating or some other coating to increase wetting and/or comfort.

The soft polymer layer 120 can be formed with one side having a concave surface 126 suitable to fit over a corneal surface of an eye. The opposing side of the disk can have a convex surface 124 that does not interfere with eyelid motion when the eye-mountable device 110 is mounted to the eye. A circular outer side edge 128 connects the concave surface 124 and convex surface 126. The eye-mountable device 110 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 110 can be selected according to the size and/or shape of the corneal surface of the wearer's eye. The shape of the eye-mountable device 110 can be specified with a curvature, astigmatism, or other properties to provide a specified optical power to an eye. Additionally or alternatively, the shape of the eye-mountable device 110 could be specified to apply a force to a cornea of an eye to which the eye-mountable device 110 is mounted, e.g., to correct keratoconus or according to some other application.

The soft polymer layer 120 can be formed with a curved shape in a variety of ways. For example, techniques similar to those employed to form vision-correction contact lenses can be employed to form the soft polymer layer 120. These methods can include molding, machining, lathing, polishing, or other processes. While the eye-mountable device 110 is mounted in an eye, the convex surface 124 faces outward to the ambient environment while the concave surface 126 faces inward, toward the corneal surface. The convex surface 124 can therefore be considered an outer, top surface of the eye-mountable device 110 whereas the concave surface 126 can be considered an inner, bottom surface. The "top" view shown in FIG. 1A is facing the convex surface 124. From the top view shown in FIG. 1A, the outer periphery 122, near the outer circumference of the curved disk is curved into the page, whereas the center region, corresponding to the location of the electroactive lens 121, near the center of the disk is curved out of the page.

An electronic apparatus is embedded within the rigid, gas permeable polymer layer 111. The electronic apparatus includes the central electroactive lens 121 surrounded by a substrate 130. The electroactive lens 121 and substrate 130 can be embedded such that the substrate 130 is situated along the outer periphery of the rigid, gas permeable polymer layer 111, away from the center region of the eye-mountable device 110. The substrate 130 does not interfere with vision because it is too close to the eye to be in focus and is positioned away from the center region of the electroactive lens 121 where incident light is transmitted, through the electroactive lens 121, to the light-sensing portions of the eye. Moreover, the substrate 130 can be formed of a transparent material to further mitigate any effects on visual perception. In some examples, the substrate 130 could be formed from and/or disposed on an element of the electroactive lens 121. For example, a particular lens of the electroactive lens 121 could include a peripheral region on which electronics can be disposed and/or on which metallic traces, electrodes, antennas, interconnects, or other conductive elements (e.g., conductive elements for electrically coupling electronics to electrodes or other elements of the electroactive lens 121) can be formed.

The substrate 130 can be shaped as a flat, circular ring (e.g., a disk with a central hole). The flat surface of the substrate 130 (e.g., along the radial width) is a platform for mounting electronics such as chips (e.g., via flip-chip mounting) and for patterning conductive materials (e.g., via deposition techniques) to form electrodes (e.g., an anode and/or cathode of an electrochemical battery, electrodes of an electrochemical sensor, contact electrodes for electrically contacting with leads of the electroactive lens 121), antenna (e), and/or connections. The substrate 130, electroactive lens 121, the rigid, gas permeable polymer layer 111, and/or the soft polymer layer 120 can be approximately cylindrically symmetric about a common central axis. The substrate 130 can be implemented in a variety of different form factors.

A loop antenna 170, controller 150, and sensor 160 are disposed on the embedded substrate 130. The controller 150 can be a chip including logic elements configured to receive power from the loop antenna 170 and to operate the loop antenna 170, sensor 160, and electroactive lens 121. The controller 150 is electrically connected to the loop antenna 170, sensor 160, and electroactive lens 121 (e.g., to conductive leads or electrodes of the electroactive lens 121) by interconnects 151 that may also wholly or partially situated on the substrate 130. The interconnects 151, the loop antenna 170, and any conductive electrodes (e.g., an anode and cathode of an electrochemical battery, for an electrochemical ion sensor, etc.) can be formed from conductive materials patterned on the substrate 130 by a process for precisely patterning such materials, such as deposition, lithography, etc. In embodiments wherein the substrate 130 is part of a lens or other element(s) of the electroactive lens 121, electrode(s) of the electroactive lens 121 could be formed on the lens or other element(s) of the electroactive lens 121 via such processes. The conductive materials patterned on the substrate 130 can be, for example, gold, platinum, palladium, titanium, carbon, aluminum, copper, silver, silver-chloride, conductors formed from noble materials, metals, combinations of these, etc. Electrode(s) of the electroactive lens 121 could be electrically coupled to the controller 150 or other electronic components of the eye-mountable device 110 via such interconnects 151 and/or via wires, conductive adhesives, liquid crystal, or some other interconnecting means.

The sensor 160 could include a variety of components configured to detect one or more physical variables of interest, e.g., a light level, a bioelectric field, a spectrum of light received from vasculature of an eye. In some examples, the sensed variable could be related to one or more parameters of a body (e.g., an amount of blood in a portion of subsurface vasculature, an oxygenation state of blood, whether an eyelid is closed), properties of the environment of the device (e.g., an ambient illumination, a barometric pressure, a temperature), properties of the device (e.g., an acceleration, an orientation), or to detect some other information. Such sensors could include accelerometers, electrodes (e.g., electrodes of an electrophysiological sensor configured to detect an electrooculogram, an electromyogram, or some other bioelectrical signal), light detectors, thermometers, gyroscopes, capacitance sensors, pressure sensors, strain gauges, light emitters, microphones, or other elements configured to detect one or more physical variables related to a property of interest. Variables detected using the sensor 160 could be used to control an optical power of the electroactive lens 121. For example, the detected variables could be related to a vergence of an eye (e.g., relative to another eye), a distance between the eye-mountable device 110 and an object in an environment of a wearer, an electrical activity of the ciliary muscles or other muscles of an eye, a pupillary diameter, or some other variable(s) that could be used to determine, e.g., a desired optical power to provide to an eye of a wearer.

Figure 1C:
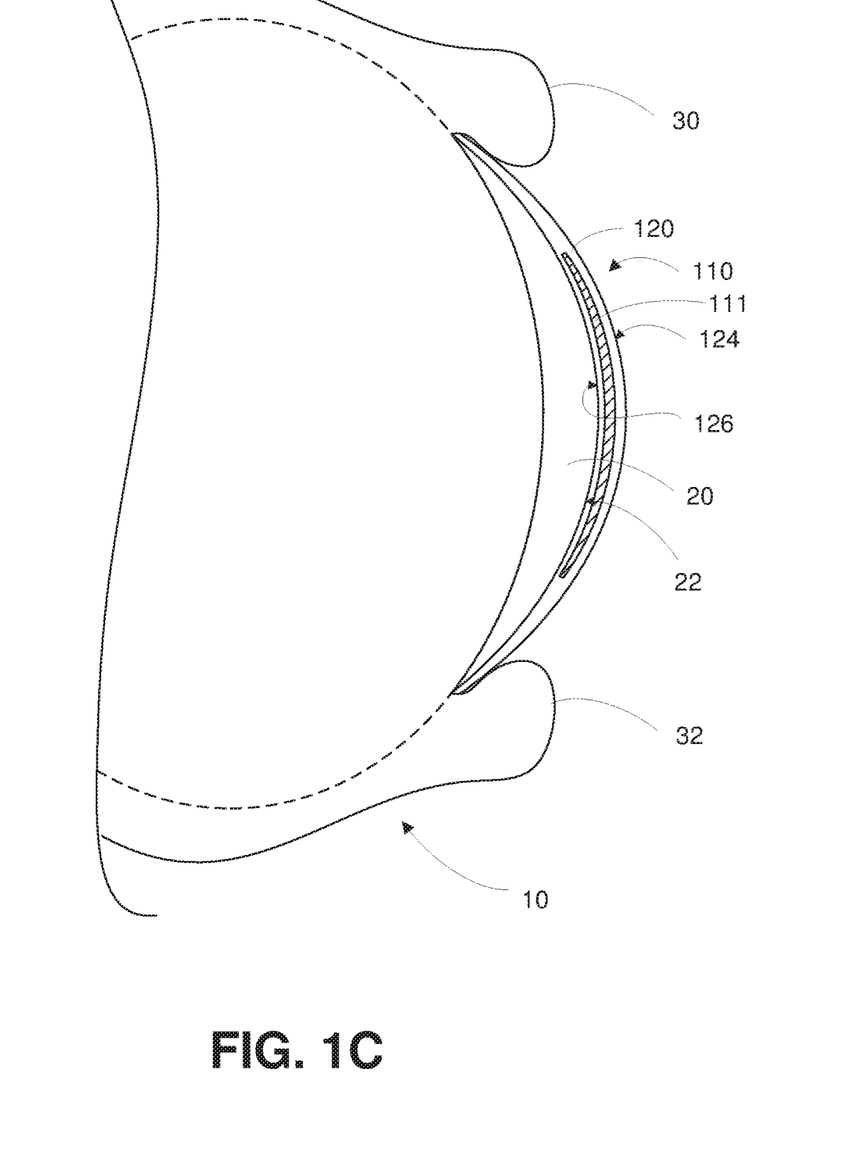
FIG. 1C is a side cross-section view of the example eye-mountable device shown in FIGS. 1A and 1B while mounted to a corneal surface of an eye.

As shown in FIGS. 1A-C, the electroactive lens 121 and other elements of the electronic apparatus are fully encapsulated within the rigid, gas permeable polymer layer 111; that is, the rigid, gas permeable polymer layer 111 completely surrounds the electronic apparatus 111 such that no aspect or element of the electronic apparatus 111 is exposed to an environment of the eye-mountable device 110 (e.g., to a tear fluid of an eye to which the eye-mountable device 110 is mounted). However, this is intended as a non-limiting example embodiment; in other embodiments, one or more volumes of liquid crystal or other elements of the electroactive lens 121, the controller 150, the antenna 130, the sensor 160, the interconnects 151, the substrate 130, and adhesive applied to the electroactive lens 121 or to some other component(s), or some other elements of the eye-mountable device could be fully encapsulated within a combination of the rigid, gas-permeable polymer layer 111 and some other component(s) of the eye-mountable device 110 such that the fully encapsulated components are protected from ingress of moisture or other substances or are provided with some other benefit related to being fully encapsulated.

For example, the rigid, gas-permeable polymer layer 111 could be formed by placing the electroactive lens 121, substrate 130, and components disposed on the substrate 130 in a mold, filling the mold with a precursor material (e.g., a solution of monomer units), and curing the precursor solution. The mold could include a number of support features that are in contact with a particular lens of the electroactive lens 121, e.g., to provide support to the electroactive lens 121 while casting the rigid, gas-permeable polymer layer 111, to control a location of the electroactive lens 121 within the formed rigid, gas-permeable polymer layer 111, or to provide some other benefit. In such an example, one or more locations of the particular lens, corresponding to the locations at which the particular lens was contacted by the support features of the mold, may be exposed following formation of the rigid, gas-permeable polymer layer 111. Thus, the particular lens of the electroactive lens 121 is not fully encapsulated within the formed rigid, gas-permeable polymer layer 111. However, other elements of the eye-mountable device, including the controller 150, the interconnects 151, one or more volumes of liquid crystal and/or further lenses of the electroactive lens 121, the sensor 160, the antenna 170, are fully encapsulated within the combination of the rigid, gas-permeable polymer layer 111 and the particular lens of the electroactive lens 121.

As shown in FIG. 1A, which is a view facing the convex surface 124 of the eye-mountable device 110, the controller 150 and sensor 160 are mounted to a side of the substrate 130 facing the convex surface 124. However, the electronics, sensor, interconnects, etc. situated on the substrate 130 can be mounted to either the "inward" facing side (e.g., situated closest to the concave surface 126) or the "outward" facing side (e.g., situated closest to the convex surface 124). Moreover, in some embodiments, some electronic components can be mounted on one side of the substrate 130, while other electronic components are mounted to the opposing side, and connections between the two can be made via conductive materials passing through the substrate 130.

The loop antenna 170 can be a layer of conductive material patterned along the flat surface of the substrate to form a flat conductive ring. In some instances, the loop antenna 170 can be formed without making a complete loop. For instance, the antenna 170 can have a cutout to allow room for the controller 150 and sensor 160, as illustrated in FIG. 1A. However, the loop antenna 170 can also be arranged as a continuous strip of conductive material that wraps entirely around the flat surface of the substrate 130 one or more times. For example, a strip of conductive material with multiple windings can be patterned on the side of the substrate 130 opposite the controller 150 and sensor 160. Interconnects between the ends of such a wound antenna (e.g., the antenna leads) can be passed through the substrate 130 to the controller 150.

FIG. 1C is a side cross-section view of the example eye-mountable electronic device 110 while mounted to a corneal surface 22 of an eye 10. It is noted that relative dimensions in FIG. 1C are not necessarily to scale, but have been rendered for purposes of explanation only in describing the arrangement of the example eye-mountable electronic device 110. Some aspects are exaggerated to allow for illustration and to facilitate explanation.

The eye 10 includes a cornea 20 that is covered by bringing the upper eyelid 30 and lower eyelid 32 together over the top of the eye 10. Incident light is received by the eye 10 through the electronically actuated lens 121, the rigid, gas permeable polymer layer 111, the soft polymer layer 120, and the cornea 20, where light is optically directed to light sensing elements of the eye 10 (e.g., rods and cones, etc.) to stimulate visual perception. The motion of the eyelids distributes a tear film across the exposed corneal surface 22 of the eye 10. The tear film is an aqueous fluid secreted by the lacrimal gland to protect and lubricate the eye 10. The tear film layers are distributed across the corneal surface 22 and/or the convex surface 124 by motion of the eyelids 30, 32. For example, the eyelids 30, 32 raise and lower, respectively, to spread a small volume of tear film across the corneal surface 22 and/or the convex surface 124 of the eye-mountable device 110. The tear film layer on the corneal surface 22 also facilitates mounting the eye-mountable device 110 by capillary forces between the concave surface 126 and the corneal surface 22. In some embodiments, the eye-mountable device 110 can also be held over the eye in part by vacuum forces against corneal surface 22 due to the concave curvature of the eye-facing concave surface 126.

Note that the eye-mountable device 110 illustrated in FIGS. 1A-C is intended as a non-limiting example embodiment. An eye-mountable device that includes an electronic apparatus at least partially embedded within a rigid, gas permeable polymer layer could include additional or alternative elements to those shown in FIGS. 1A-C, or could lack some of the elements shown in FIGS. 1A-C. For example, such an eye-mountable device could lack a sensor. Further, while elements of the eye-mountable device 110 shown in FIGS. 1A-C are fully encapsulated within the rigid, gas permeable polymer layer 111, and the rigid, gas permeable polymer layer 111 is fully encapsulated within the soft polymer layer 120, an eye-mountable device as described herein could include an electronic apparatus that is only partially embedded within a rigid, gas permeable polymer layer and/or soft polymer layer. For example, one or more channels, windows, or other features could be formed in such polymer layer(s) could expose electrodes, sensors, or other elements of such a partially embedded electronic apparatus to an environment of such an eye-mountable device.

Still further, while the eye-mountable device 110 illustrated in FIGS. 1A-C includes a rigid, gas permeable polymer layer 111 embedded within a soft polymer layer 120 that is formed to mount directly to an eye, an eye-mountable device could be configured differently and/or include additional or alternative elements configured to facilitate mounting of the eye-mountable device to an eye. For example, the eye-mountable device 110 could lack the soft polymer layer 120 and the rigid, gas permeable polymer layer 111 could itself be shaped to mount directly to an eye (e.g., could have a shape similar to the illustrated soft polymer layer 120). In some examples, the rigid, gas permeable polymer layer 111 could be shaped such that the rigid, gas permeable polymer layer 111 can be mounted on or within the soft polymer layer 120 such that the combination of the rigid, gas permeable polymer layer 111 and the soft polymer layer 120 can be removably mounted to an eye in a manner that is compatible with eyelid motion. The soft polymer layer 120 and the rigid, gas permeable polymer layer 111 could be configured in this way to permit reuse of the rigid, gas permeable polymer layer 111 and electronic apparatus encapsulated therein, to permit dry storage of the rigid, gas permeable polymer layer 111 and electronic apparatus therein (e.g., to reduce a rate of degradation of a chemical sensor of the electronic apparatus, to reduce a rate of degradation of a liquid crystal of the electroactive lens 121), or to provide some other benefit.

The rigid, gas permeable polymer layer 111 could be configured to be mounted on or within the soft polymer layer 120 in a variety of ways, e.g., via capillary forces, via an adhesive, via formed prongs, clips, ridges, or other formed elements in one or both of the soft polymer layer 120 and/or the rigid, gas-permeable polymer layer 111, or using some other means to mount the rigid, gas permeable polymer layer 111 on or within the soft polymer layer 120. The rigid, gas permeable polymer layer 111 and soft polymer layer 120 could be configured such that, when the rigid, gas permeable polymer layer is mounted to the soft polymer layer, the rigid, gas permeable polymer layer is fully encapsulated within the soft polymer layer or such that the rigid, gas permeable polymer layer is only partially encapsulated within the soft polymer layer (e.g., such that an outer surface of the rigid, gas permeable polymer layer is in contact with a corneal surface or an inner eyelid surface of an eye when the rigid, gas permeable polymer layer is mounted to the soft polymer layer and the combination of the rigid polymer layer and the soft polymer layer is mounted to the eye).

The electronically actuated lens 121 is configured such that a voltage, current, or other property of an electrical signal applied to the electronically actuated lens 121 can be controlled to control the optical power of the electronically actuated lens 121. In some examples, this could include applying a voltage across a layer of liquid crystal of the electronically actuated lens 121 to, e.g., control a refractive index of the liquid crystal. The electronically actuated lens 121 could include additional elements, e.g., electrodes to apply a voltage or current to a liquid crystal or other element of the electronically actuated lens 121, one or more layers of material configured to contain and/or provide structure to other elements of the electronically actuated lens 121 (e.g., one or more rigid layers, formed as lenses, that contain a liquid crystal and that include a texture configure to align the liquid crystal relative to the rigid layers), or other components. In some examples, the electronically actuated lens 121 could include one or more elements (e.g., one or more textured, rigid layers on which electrodes are disposed) composed of a rigid, gas permeable polymeric material, e.g., of the same material from which the rigid, gas permeable polymer layer 111 is formed.

The electroactive lens 121 could include two or more lenses between which are disposed one or more volumes of liquid crystal. For example, the electroactive lens 121 could include stacked first, second, and third lenses, a first volume of liquid crystal disposed between the first and second lenses, and a second volume of liquid crystal disposed between the second and third lenses. Such an electroactive lens, including two separate volumes of liquid crystal, could be configured such that anisotropy in the optical effects of the liquid crystal is at least partially compensated for by providing the anisotropic optical effect in a first direction using the first volume of liquid crystal and also providing the anisotropic effect in a second, perpendicular direction using the second volume of liquid crystal. Two or more electrodes could also be provided (e.g., deposited or otherwise formed on one or more of the lenses) to apply an electrical field or other electrical force or energy to the volume(s) of liquid crystal of the electroactive lens 121 to control the optical power (e.g., the diopter, the focal length) of the electroactive lens 121.

Figure 2A:
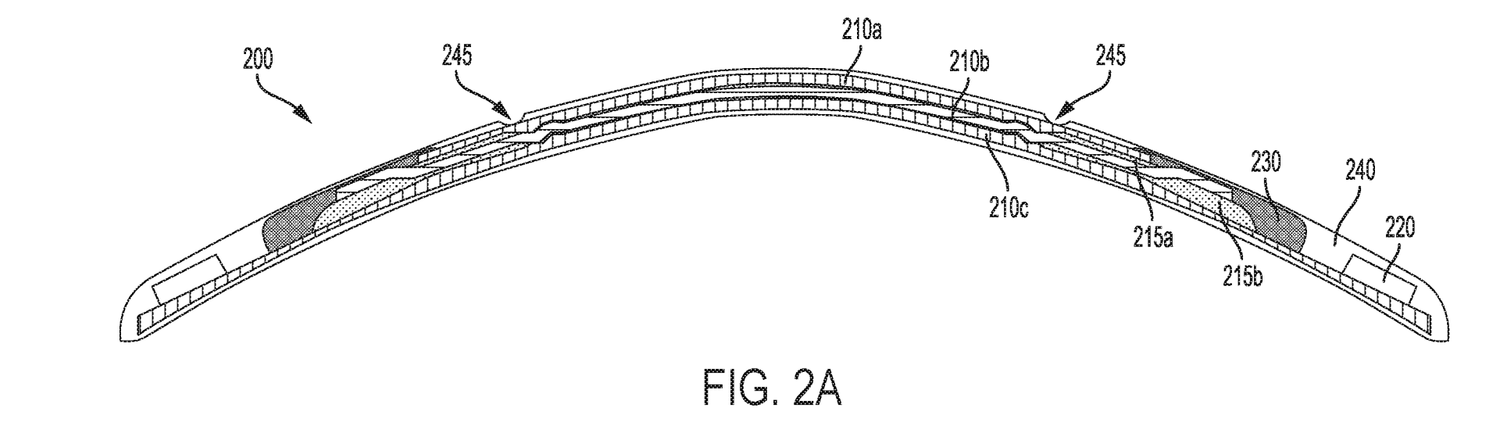
FIG. 2A is a side cross-section view of an example device.
Figure 2B:
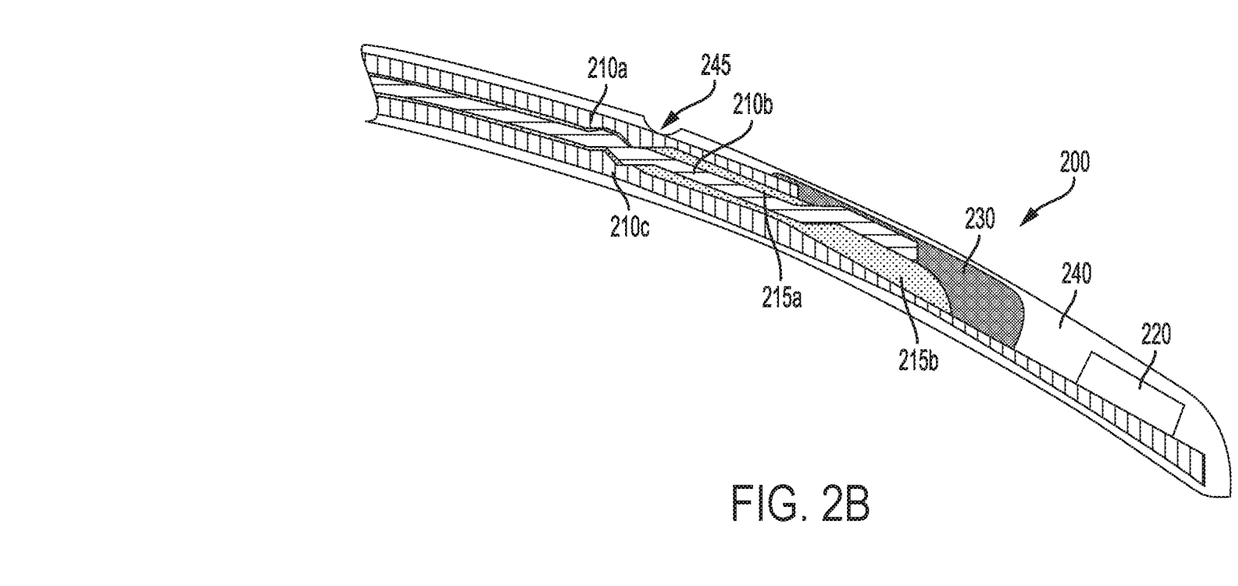
FIG. 2B is a close-up side cross-section view of the device shown in FIG. 2A.
Figure 2C:
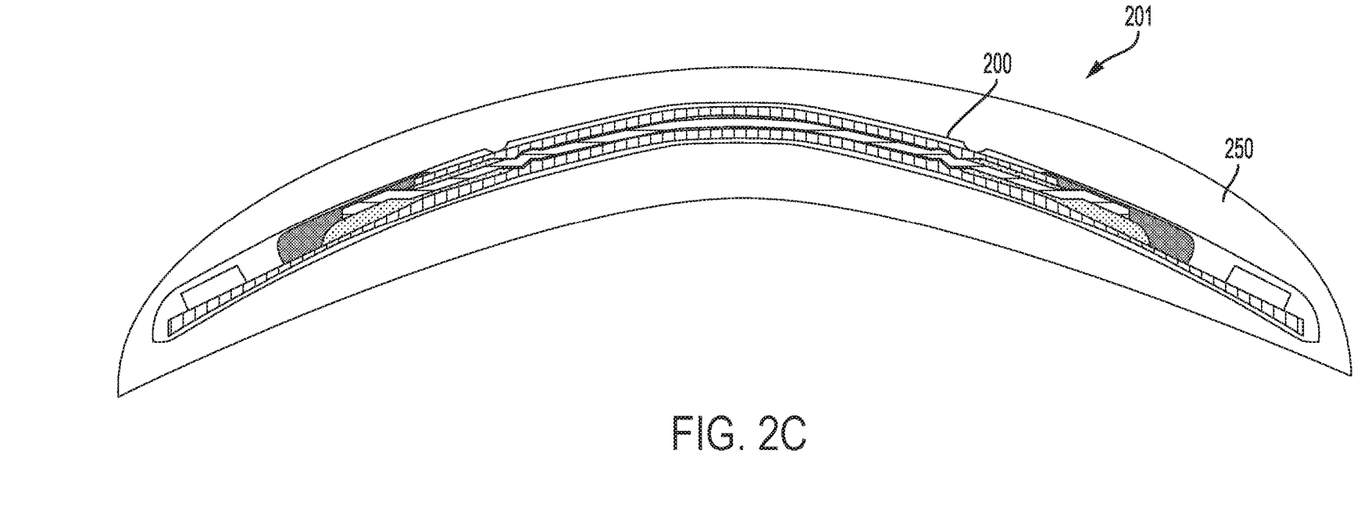
FIG. 2C is a side cross-section view of an example eye-mountable device that includes the device shown in FIGS. 2A and 2B.

FIGS. 2A and 2B show, in cross-section, an example device 200 that includes an electroactive lens and electronics 220 encapsulated within a rigid, gas permeable polymer layer 240. FIG. 2B shows a close-up view of a portion of the example device 200. The device 200 could be eye-mountable (e.g., the rigid, gas permeable polymer layer 240 could be shaped to be contact-mounted to a corneal surface of an eye), could be incorporated into an eye-mountable device (e.g., by being disposed within a soft polymer layer that is shaped to be contact-mounted to an eye), or could be incorporated into some other device or system and/or used to facilitate some other application. FIG. 2C shows an example eye-mountable device 201 that includes the device 200 fully encapsulated within a soft polymer layer 250.

The electroactive lens includes a first lens 210a, a second lens 210b, and a third lens 210c that are stacked together. The lenses 210a, 210b, 210c have formed features (e.g., ridges, bumps, holes, etc.) to facilitate stacking and alignment of the lenses 210a, 210b, 210c, to facilitate the containment of layers and/or reservoirs of liquid crystal between the lenses 210a, 210b, 210c, or to provide some other functionality. This is shown by way of example in FIGS. 2B and 2D.

FIG. 2B illustrates a close-up cross-sectional view of the lenses 210a, 210b, 210c of the electroactive lens. The electroactive lens further includes a first volume of liquid crystal 215a disposed between the first lens 210a and the second lens 210b and a second volume of liquid crystal 215b disposed between the second lens 210b and the third lens 210c. The electroactive lens further includes two or more electrodes (not shown). Such electrodes could be formed on surfaces of one or more of the lenses 210a, 210b, 210c, e.g., by a process of sputtering, deposition, photoetching or photopatterning, or some other processes. The electrodes could be formed from transparent conductive materials (e.g., thin films of indium tin oxide, transparent conductive polymers, or some other conductive material that is substantially transparent when formed as a thin film) or otherwise formed to be transparent to visible light (e.g., a layer of silver nano-wires, an array, grid, or other pattern of formed conductive traces that have sufficiently narrow widths to be substantially transparent and/or to be sufficiently out-of-focus to the eye of a wearer so as to be functionally transparent).

Figure 2D:
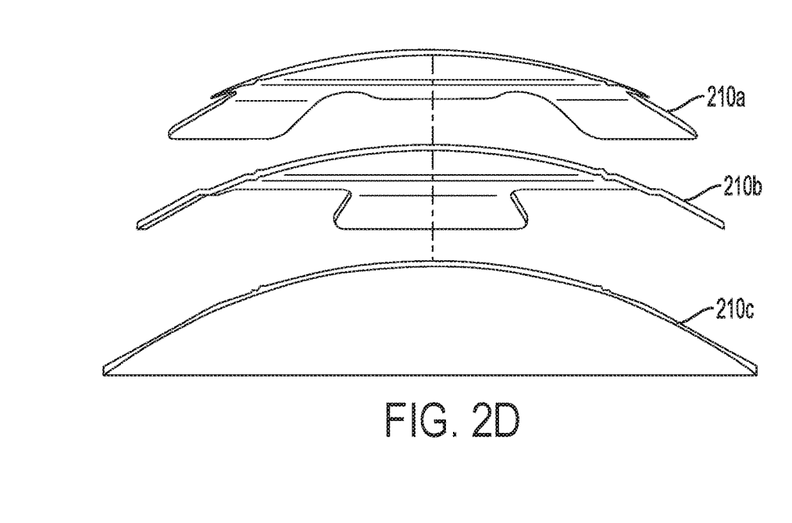
FIG. 2D is an exploded view that illustrates elements of the device shown in FIG. 2A.

FIG. 2D illustrates an exploded view of the lenses 210a, 210b, 210c of the electroactive lens, showing how each of the lenses may include tabs, ridges, or other features to facilitate stacking and/or alignment of the lenses relative to each other or to some other component(s) (e.g., a substrate bearing electronics, a mold into which the electroactive could be disposed in order to form an encapsulating rigid polymer layer), to facilitate the formation and maintenance of a thin layer of liquid crystal between each of the lenses, or to provide some other benefits. In some examples, a conductive metal or other material could be formed into electrodes and/or traces on one or more of the lenses, and such conductive material could extend onto the illustrated tabs in order to facilitate electrical coupling between such conductive materials and components (e.g., other conductive traces or electrodes, integrated circuits, or other electrical circuitry) on other lenses and/or on some other component of a formed eye-mountable device.

Voltages can be applied to the two or more electrodes to control an overall optical power of the electroactive lens, e.g., by controlling a refractive index of the volumes of liquid crystal 215a, 215b by applying electric fields thereto. One or more of the lenses 210a, 210b, 210c could include grooves or some other texturing to facilitate alignment of molecules of the liquid crystal 215a, 215b with the surface(s) of the lens(es) 210a, 210b, 210c. In some examples, the change in refractive index of the liquid crystal, as a result of the application of an electric field to the liquid crystal, could be anisotropic. In such examples, an electroactive lens could include multiple volumes of liquid crystal (e.g., as shown in FIGS. 2A, 2B, and 2C) and could be configured such that the directions of refractive index anisotropy of the volumes of liquid crystal are in different directions, e.g., in perpendicular directions. This could be done such that the overall refractive effect of the electroactive lens on incoming light is substantially independent of the polarization of the incoming light and/or such that the overall refractive effect of the electroactive lens on incoming light is substantially axially symmetric.

The third lens 210c forms a substrate on which electronics 220 are disposed. The electronics 220 could include integrated circuits, discrete components, controllers, transceivers, sensors, batteries, or other electronic components. Conductive traces could be patterned or otherwise disposed on the third lens 210c and could electrically couple the electronics 220 to electrodes of the electroactive lens (e.g., electrodes that are also formed via patterning or other techniques on the third lens 210c or on some other elements of the electroactive lens). Antennas, electrodes of a sensor, electrodes of a battery, or some other elements could be formed on the third lens 210c. Additionally or alternatively, the electronics 220, traces, interconnects, or other components of the device 200 could be disposed on a discrete substrate and the discrete substrate could be mounted to the third lens 210c and/or electrically coupled to electrodes of the electroactive lens.

The device 200 includes an adhesive 230 that is in contact with the first 210a, second 210b, and third 210c lenses and that, in combination with the lenses 210a, 210b, 210c, contains the first 215a and second 215b volumes of liquid crystal. The adhesive could be composed of a variety of materials, e.g., a silicone adhesive or poly(methyl methacrylate). The adhesive could be a transparent and/or gas-permeable material. The adhesive 230 could be disposed on the lenses 210a, 210b, 210c and cured before or after the electronics 220 and/or the interconnects, antennas, electrodes, or other traces are formed or otherwise disposed on the third lens 210c.

The adhesive 230 could be cured before a precursor material is applied to the other elements of the device 200 to form the rigid, gas-permeable polymer layer 240. For example, the adhesive 230 could be cured immediately after application on the lenses 210a, 210b, 210c in order to maintain the relative location of the lenses and/or of the liquid crystal between the lenses during a fabrication process, e.g., a process of disposing the electronics 220 on the third lens 210c. The precursor material could then be disposed on the other element of the device 200 (e.g., within a mold) and cured to form the rigid, gas-permeable polymer layer 240.

Alternatively, the adhesive 230 could be cured after application of such a precursor material to the other elements of the device 200, e.g., the adhesive 230 and precursor material could be cured at the same time by application of ultraviolet light. In such examples, the adhesive in its un-cured form may be immiscible with the precursor material. This could include solvents in the adhesive and/or the precursor material being immiscible, e.g., by being hydrophilic and hydrophobic, respectively, or vice versa. In some examples, the adhesive could be a silicone adhesive.

The rigid, gas-permeable layer 240 includes a number of indentations 245. These indentations may correspond to the locations at which the first lens 210a was supported, within a mold or other enclosure by pins or other support features of such an enclosure, when a precursor material was applied to the electroactive lens and other elements of the device 200 to form the rigid, gas-permeable layer 240. As a result, the first lens 210a may be exposed at one or more of the indentations 245. Thus, the electroactive lens and other elements of the device 200 (e.g., the electronics 220, the volumes of liquid crystal 215a, 215b) may not be fully encapsulated within the rigid, gas-permeable layer 240. However, the adhesive 230, the volumes of liquid crystal 215a, 215b, the second 210c and third 210c lenses, the electronics 220, interconnects or other traces formed on the third lens 210c, or other elements of the device 200 are fully encapsulated within a combination of the first lens 210a and the rigid, gas-permeable polymer layer 240. In order to improve the quality of such encapsulation (e.g., to reduce a rate or probability of ingress of tears, saline, or some other aqueous solution into the device 200), the first lens 210a and the rigid, gas-permeable polymer layer 240 could be formed from the same material.

III. EXAMPLE FABRICATION OF EYE-MOUNTABLE DEVICES

Devices (e.g., eye-mountable devices) that include an electroactive lens, electronics, and/or other components fully encapsulated within a rigid, gas permeable polymer layer (or within a combination of such a layer and one or more lenses of the electroactive lens) as described herein may be fabricated in a variety of ways. In some examples, this could include applying an adhesive to lenses of the electroactive lens to contain one or more volumes of liquid crystal between such lenses, to secure the lenses to each other and/or to some other elements of the device (e.g., a substrate on which are disposed electronics), to prevent contact between the liquid crystal and a precursor material used to form one or more polymer layers of the device, or to provide some other benefit. The electroactive lens, adhesive disposed thereon, electronics coupled to electrodes of the electroactive lens, or other elements could be disposed within an amount of a precursor material (e.g., within a mold), and the precursor material could then be cured to form the rigid, gas-permeable polymer layer. The rigid, gas-permeable polymer layer can then be lathed, polished, or otherwise machined to shape the rigid, gas-permeable polymer layer according to an application. Additionally or alternatively, the shape of the rigid, gas-permeable polymer layer could be specified by the shape of a mold within which the precursor material was disposed for curing (e.g., the shape could be specified by casting the rigid polymer layer in the mold).

FIGS. 3A through 3G illustrate steps in an example process of fabricating an eye-mountable device that includes an electroactive lens as described herein. Although FIGS. 3A through 3G are illustrated in a sequential order, the processes illustrated in each figure may in some instances be performed in parallel, and/or in a different order than the order depicted in the figures. For example, an adhesive may be applied to an electroactive lens before or after electronics are electrically coupled to electrodes of the lens. Also, processes illustrated in the various figures may be combined, divided, and/or removed based upon the desired implementation The process begins in FIG. 3A, which illustrates an electroactive lens 300. The electroactive lens includes first 310a, second 310b, and third 310c lenses stacked atop each other. The lenses 310a, 310b, 310b could be formed from a variety of materials, e.g., from a rigid, gas-permeable polymeric material. The lenses 310a, 310b, 310c could be cast, machined, lathed, polished, or otherwise formed to include ridges, pins, textures, or other features to align the lenses relative to each other, e.g., such that they are coaxial or such that an angle between a texture formed on the surface of one of the lenses and a texture formed on the surface of another one of the lenses corresponds to a specified angle.

Figure 3A:
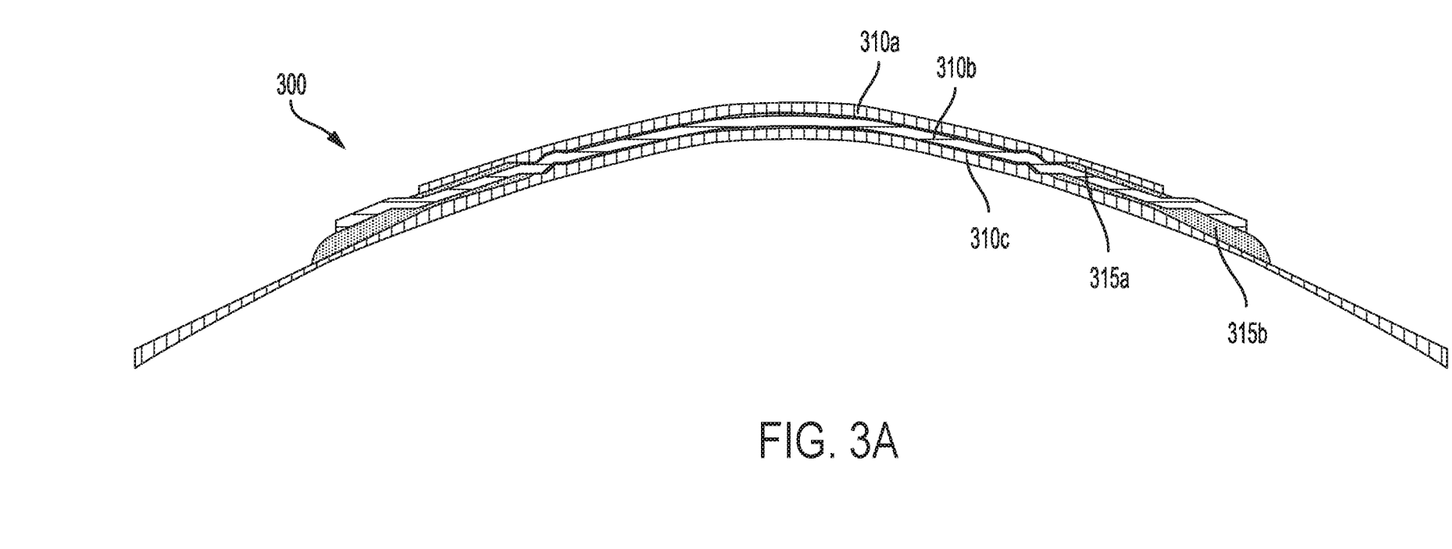
FIG. 3A is a cross-section view that illustrates elements of an example eye-mountable device during fabrication of the example eye-mountable device.

The electroactive lens 300 additionally includes a first volume of liquid crystal 315a disposed between the first 310a and second 310b lenses and a second volume of liquid crystal 315b disposed between the second lens 310b and the third lens 310c. The lenses 310a, 310b, 310c may include ridges, micro channels, textures, or other features specified to retain a thin layer of liquid crystal between the pairs of lenses, to provide reservoirs of liquid crystal in fluid contact with such thin layers, to align molecules of the liquid crystal in a particular direction or orientation, or to provide some other benefit.

The electroactive lens 300 also includes two or more electrodes (not shown) to which voltages can be applied to control an overall optical power (e.g., a diopter, a focal length) of the electroactive lens. Such electrodes could be formed on one or more of the lenses 310a, 310b, 310c and composed from a transparent material.

Figure 3B:
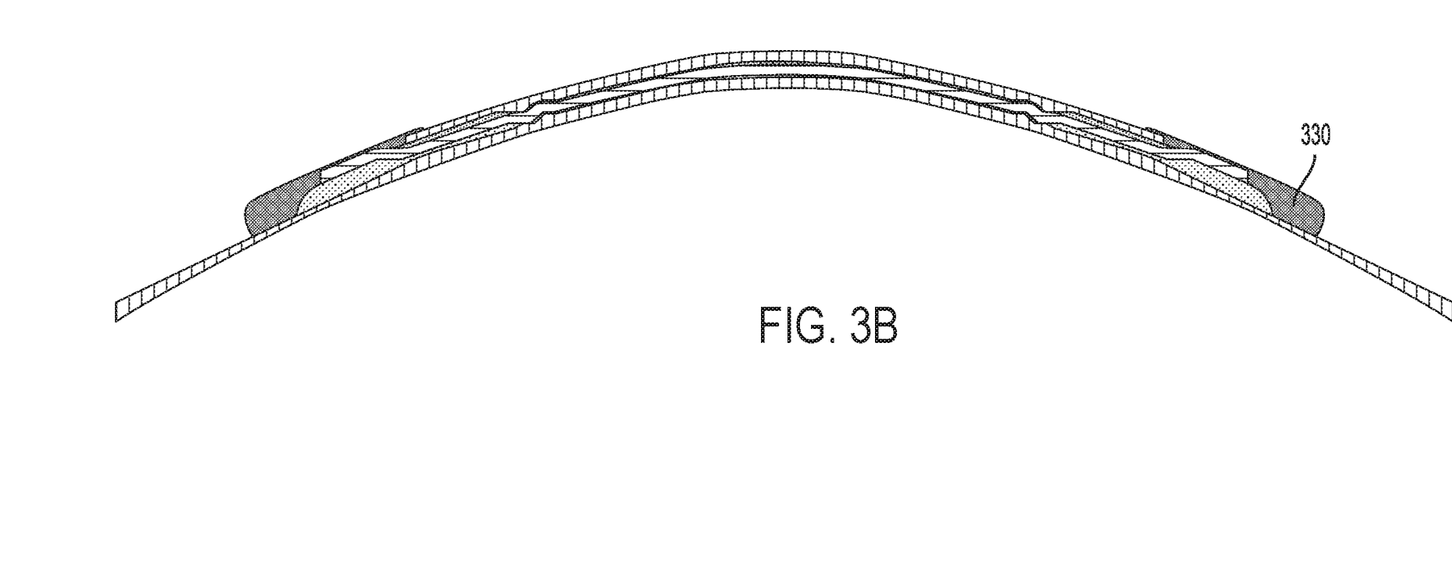
FIG. 3B is a cross-section view that illustrates elements of an example eye-mountable device during fabrication of the example eye-mountable device.

FIG. 3B illustrates the application of an adhesive 330 to the electroactive lens 300. The applied adhesive 330 contacts the lenses 310a, 310b, 310c such that the volumes of liquid crystal 315a, 315b are contained within a combination of the lenses 310a, 310b, 310c and the applied adhesive 330. The applied adhesive could be a silicone adhesive or could be some other type of adhesive. The adhesive 330 could be self-curing (e.g., could cure by exposure to the ambient environment or as a result of having been produced by mixing two or more constituent materials) or could be cured by the application of heat, ultraviolet light, or some other energy or environmental conditions. The adhesive 330 could be cured after it is applied to the electroactive lens 300 but before performing any further processes on the electroactive lens 300, or the adhesive 330 could be left in an uncured or partially cured state until after some other processes (e.g., coupling of electronics to electrodes of the electroactive lens 300, disposition of the electroactive lens 300 within a mold and/or disposition of a precursor material within such a mold) have been performed on the electroactive lens 300. The adhesive 330 could be applied by inkjet printing, by manual or robotic application via syringe, or by some other process.

Note that the location and extent of the adhesive 330 shown in FIG. 3B is intended as a non-limiting example. For example, the adhesive 300 could be applied to contact and/or contain some other elements of a device formed using the electroactive lens 300. For example, the adhesive 330 could also be applied to contact and/or contain integrated circuits or other electronic components disposed on or otherwise mechanically or electrically coupled to the electroactive lens 300.

Figure 3C:
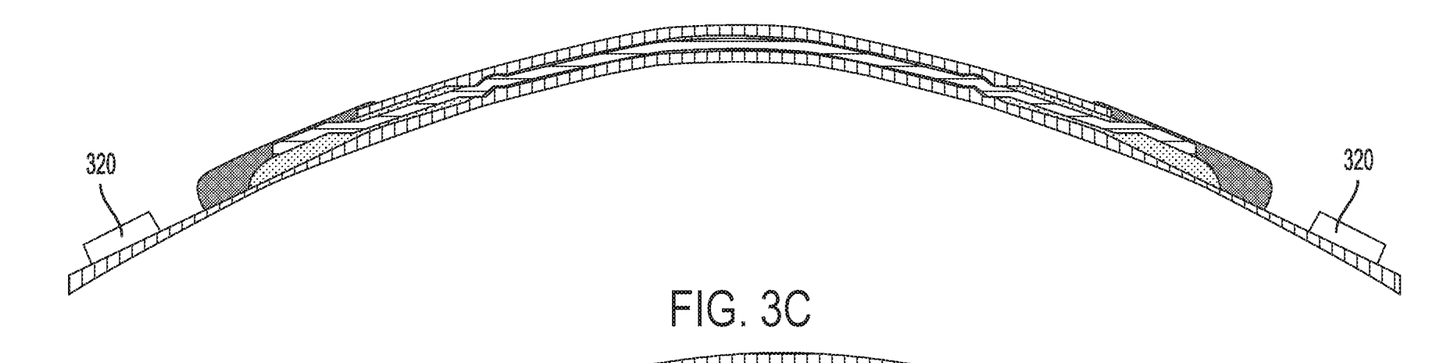
FIG. 3C is a cross-section view that illustrates elements of an example eye-mountable device during fabrication of the example eye-mountable device.

FIG. 3C illustrates the electrical coupling of electronics 320 to the two or more electrodes of the electroactive lens 300. As shown in FIG. 3C, this may include disposing the electronics 320 on the third lens 310c. Metallic traces or other interconnects could be formed on the third lens 310c or on some other elements of the electroactive lens 300 and the electronics 320 could be coupled via such interconnects to the electrodes of the electroactive lens 300. Additionally or alternatively, the electronics could be disposed on one or more separate substrates and the separate substrates and/or the electronics disposed thereon could be electrically coupled to the electrodes of the electroactive lens 300 via such interconnects and/or via some other means. The electronics 320 could be electrically coupled to traces via soldering, welding, wire-bonding, application of conductive adhesives, flip-chip processes, or some other methods. The electronics 320 may include a variety of components (e.g., a controller, a loop antenna, a sensor, a battery) formed by a variety of processes or methods.

Figure 3D:
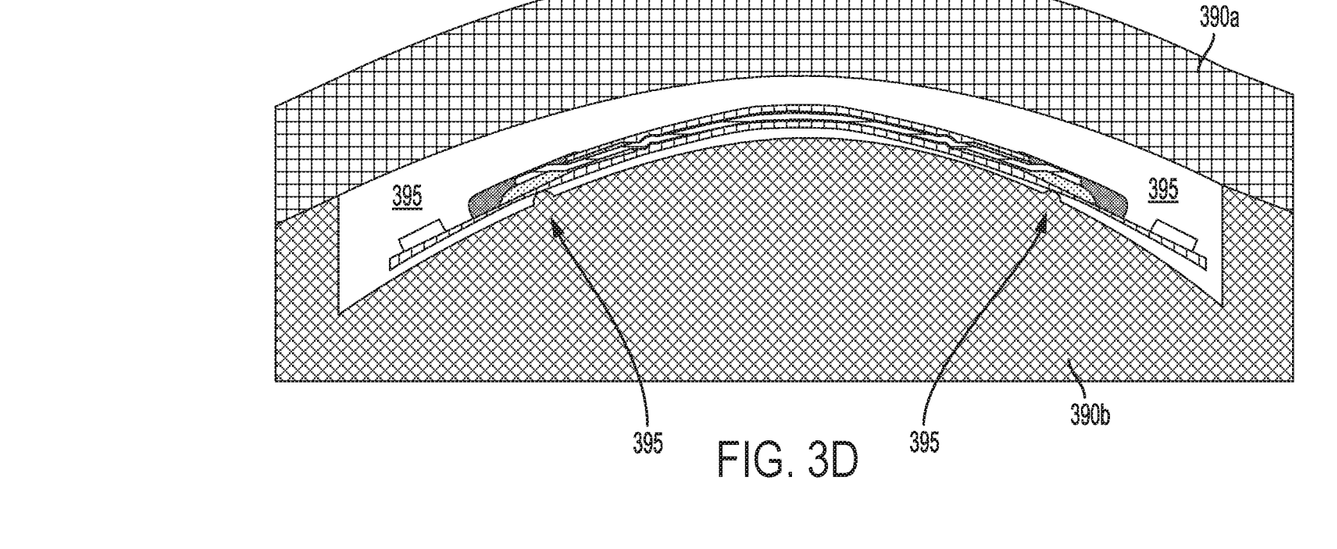
FIG. 3D is a cross-section view that illustrates elements of an example eye-mountable device during fabrication of the example eye-mountable device.

FIG. 3D illustrates the disposition of the electroactive lens 300 and electronics 320 electrically coupled thereto within a mold. The mold includes a first portion 390a and a second portion 390b; when the first 390a and second 390b portions are brought together as illustrated in FIG. 3D, they form an enclosed internal volume 395. The electroactive lens 300 and electronics 320 may be supported within the enclosed internal volume 395 of the mold by one or more pins, ridges, or other features of the mold in order to provide a separation between surfaces of the mold (e.g., a surface of the second portion 390b of the mold) and surfaces of the electroactive lens 300 or other elements coupled thereto, to specify a location and/or orientation of the electroactive lens 300 within the enclosed internal volume 395 of the mold, or to provide some other benefit. As shown, the second portion of the mold 390b includes support features 395 that contact the third lens 310c. The illustrated mold, composed of two separable portions, is intended as a non-limiting example of a mold that could be used to cast or otherwise form a rigid, gas-permeable polymer layer as described herein. A mold could include more or fewer portions configured and/or operated in some other way.

Figure 3E:
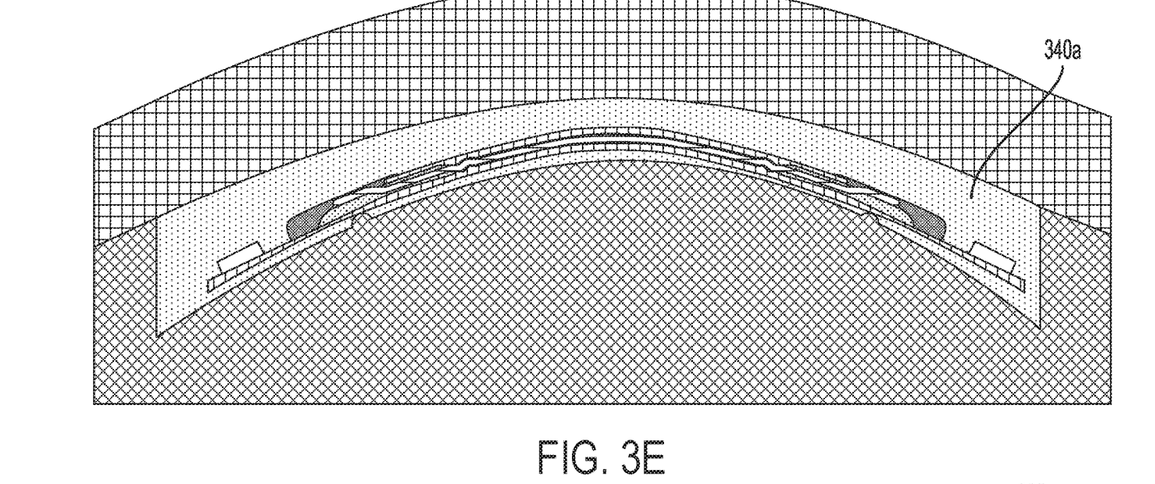
FIG. 3E is a cross-section view that illustrates elements of an example eye-mountable device during fabrication of the example eye-mountable device.
Figure 3F:
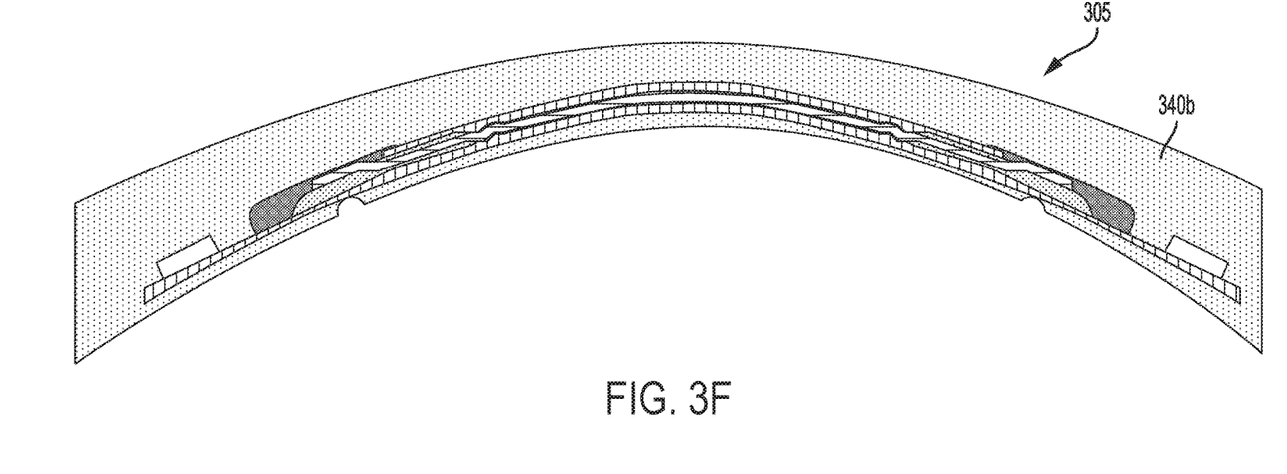
FIG. 3F is a cross-section view that illustrates elements of an example eye-mountable device during fabrication of the example eye-mountable device.
Figure 3G:
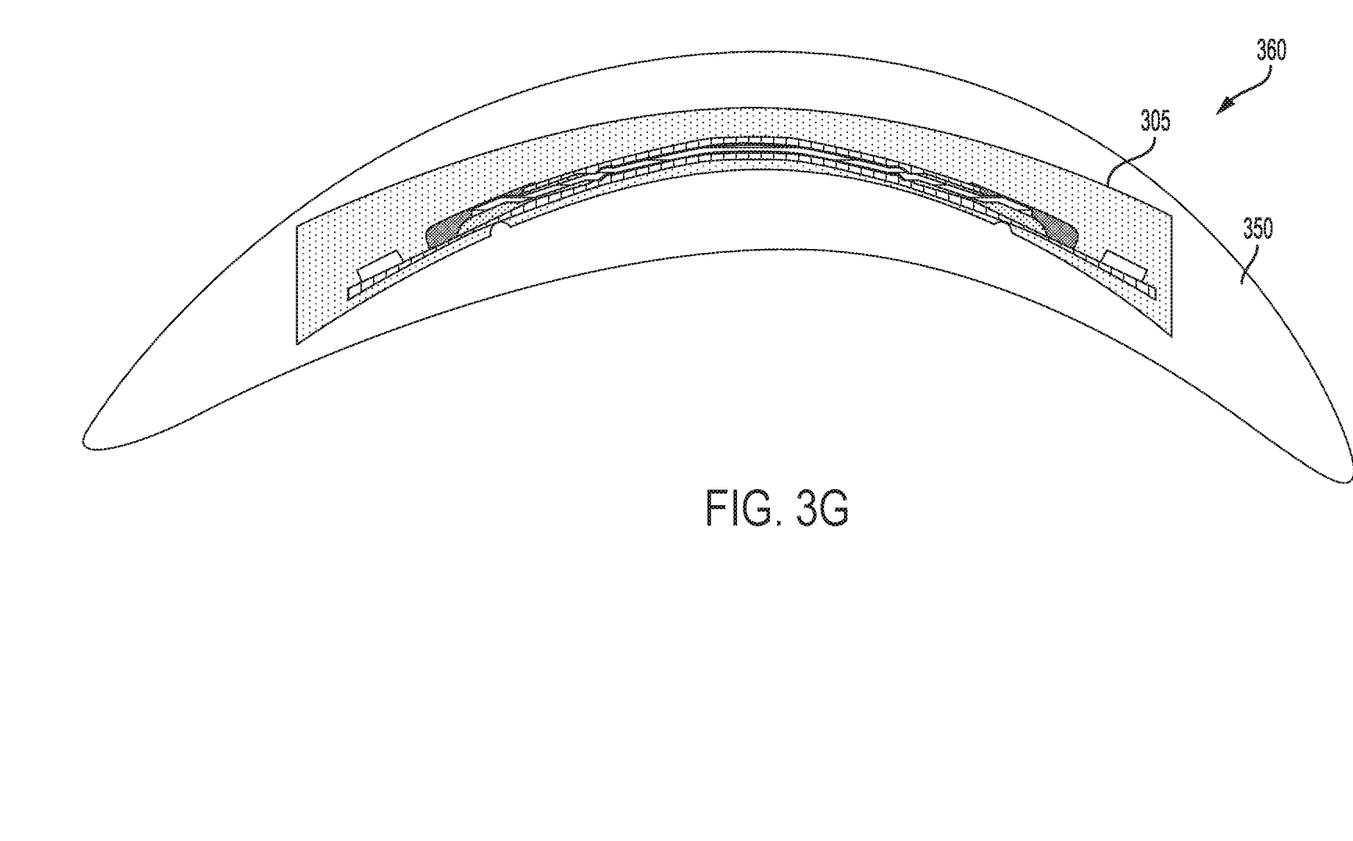
FIG. 3G is a cross-section view that illustrates an example eye-mountable device.

FIG. 3E illustrates the disposition of a precursor material 340a within the enclosed internal volume 395 of the mold such that the electroactive lens 300, the electronics 320, and the applied adhesive 330 are disposed within the precursor material 340a. The precursor material 340a includes one or more monomers or other compounds or substances that can be cured to form a rigid, gas permeable polymer layer (e.g., to form a silicone acrylate material). The precursor material 340a may additionally include polymerization initiators (e.g., substances that generate free radicals in response to exposure to ultraviolet light), linking elements configured to result in branching and/or crosslinking between polymer chains formed from the precursor material 340a, substances configured to block ultraviolet light from being transmitted through the formed rigid, gas permeable polymer layer, hardening agents, agents that facilitate transport of oxygen through the formed rigid, gas permeable polymer layer (e.g., by facilitating the formation of channels or other structures within the formed rigid, gas permeable polymer layer), or other substances according to an application. The precursor material 340a could have a composition such that the formed rigid, gas permeable polymer layer is optically transparent and further such that the precursor material 340a can be cast as illustrated in FIGS. 3E, 3F, and 3G, e.g., by ultraviolet curing while in a mold. For example, the precursor material 340a could include one or more di(meth) acrylate-derived monomeric units and one or more (meth) acrylate-derived monomeric units.

Note that the electroactive lens 300, the electronics 320, the applied adhesive 330, and/or other elements could be disposed within a precursor material via some other method or process. For example, a mold into which such elements and the precursor material are disposed could lack the support features 395 and the location of the electroactive lens within the mold could be controlled by the application of electrical or magnetic fields, by one or more support features formed in the electroactive lens, by the viscosity or other properties of the precursor material, or by some other process, material, or property. Further, the precursor material could be applied without a mold, e.g., by depositing an amount of the precursor material on the electroactive lens. The deposited precursor material could then be cured and machined, polished, or otherwise formed into a specified shape. Multiple volumes of rigid, gas-permeable polymer material could be formed via these or other processes in order to form, in combination, a rigid, gas-permeable polymer layer that fully encapsulates one or more elements of the electroactive lens 300, the adhesive 330, the electronics 320, or some other elements of a device formed via processes described herein.

FIG. 3F illustrates the precursor material 340a having been cured to form a rigid, gas permeable polymer layer 340b and removed from the mold. The shape of the rigid, gas permeable polymer layer 340b corresponds to the geometry of the enclosed internal volume 395 of the mold. Curing the precursor material 340a could include exposing the precursor material 340a to heat, pressure, light (e.g., ultraviolet light), chemicals, an atmosphere having a specified property (e.g., an atmosphere that is low in humidity), or to some other factors or substances to cause and/or accelerate the formation of the rigid, gas permeable polymer layer 340b from the precursor material 340a. Additionally or alternatively, the precursor material 340a could be configured to cure over time without any particular triggering agent (e.g., the precursor material 340a could include a two-part mixture of substances that, when mixed, act to form the rigid, gas permeable polymer layer 340b); in such examples, curing the precursor material 340a could include allowing the precursor material 340a to cure for a specified period of time. In some examples, curing of the applied adhesive 330 and curing of the precursor material 340a could at least partially overlap in time. In such examples, the applied adhesive 330 and precursor material 340a could be immiscible. Further, in such examples the applied adhesive 330 could exhibit a very low amount of swelling or contraction as a result of curing. In examples where both the applied adhesive 330 and the precursor material 340a are cured by exposure to similar conditions (e.g., by exposure to ultraviolet light), the applied adhesive 330 and the precursor material 340a could be cured simultaneously by application of such conditions.

The method additionally includes forming an eye-mountable device by disposing the formed rigid, gas-permeable polymer layer 340b within a soft polymer layer. This is illustrated in FIG. 3G, showing an eye-mountable device 360 formed from a soft polymer layer 350 that fully encapsulates the rigid, gas-permeable polymer layer 340b. The soft polymer layer 350 is shaped to be contact mounted to an eye and includes a silicon hydrogel or some other material configured for such mounting. The soft polymer layer 350 could be formed by casting, by disposing the rigid, gas-permeable polymer layer 340b within an amount of a precursor material and curing the precursor material to form an amount of soft polymeric material, by machining, trimming, lathing, polishing, or otherwise shaping such a formed soft polymeric material, and/or by some other process or combination of processes. The soft polymer layer 350 could be formed on the rigid, gas-permeable polymer layer 340b, e.g., by casting. Alternatively, the soft polymer layer 350 could be formed separately from the rigid, gas-permeable polymer layer 340b and the illustrated eye-mountable device 360 could be formed by combining the rigid, gas-permeable polymer layer 340b and the soft polymer layer 350, e.g., by inserting the rigid, gas-permeable polymer layer 340b into a pocket or other formed feature or void on or within the soft polymer layer 350. The soft polymer layer 350 and/or the eye-mountable device 360 could be formed by some other process(es).

Note that the steps and elements described in combination with FIGS. 3A-3G are intended as non-limiting example embodiments; additional or alternative steps and/or elements are anticipated.

IV. CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:
   an electroactive lens assembly including liquid crystal disposed between a first lens body and a second lens body, the electroactive lens assembly further including first and second electrodes that alter an optical power of the electroactive lens assembly when a voltage is applied across the first and second electrodes, wherein the first and second lens bodies are physically distinct elements that are stacked;
   an electronic circuit electrically coupled to the first and second electrodes of the electroactive lens assembly;
   an adhesive adhered to the first lens body and the second lens body of the electroactive lens assembly; and
   a rigid, gas-permeable polymer layer, wherein the adhesive and the electronic circuit are fully encapsulated by a combination of the rigid, gas-permeable polymer layer and one or more lens bodies of the electroactive lens assembly,
   wherein at least one of the first or second lens bodies of the electroactive lens assembly comprises a rigid, gas-permeable polymeric material.

2. The device of claim 1, further comprising:
   a soft polymer layer, wherein the gas-permeable polymer layer is fully enclosed within the soft polymer layer, wherein the soft polymer layer is mountable to a corneal surface of an eye.

3. The device of claim 2, wherein the soft polymer layer comprises a silicone hydrogel.

4. The device of claim 1, wherein the electroactive lens assembly further comprises:
   a third lens body; and
   additional liquid crystal disposed between the second lens body and the third lens body, wherein the adhesive is further adhered to the third lens body of the electroactive lens assembly, and wherein the additional liquid crystal is contained within a combination of the second lens body, the third lens body, and the adhesive.

5. The device of claim 4, wherein in the electronic circuit is mounted on the third lens body and electrically coupled to control application of the voltage across the first and second electrodes, wherein the electronic circuit is positioned radially outside of the adhesive on the third lens body.

6. The device of claim 1, wherein the first and second lens bodies of the electroactive lens assembly and the rigid, gas-permeable polymer layer comprise the same rigid, gas-permeable polymeric material.

7. The device of claim 1, wherein the adhesive comprises a silicone adhesive.

8. The device of claim 1, wherein the adhesive is immiscible with a precursor material used to form the rigid, gas-permeable polymer layer.

9. The device of claim 8, wherein the precursor material comprises:
   one or more di(meth)acrylate-derived monomeric units; and
   one or more (meth)acrylate-derived monomeric units.

10. The device of claim 1, wherein the device comprises a contact lens for wearing on an eye and the electroactive lens assembly provides adjustable optical power to restore visual accommodation to the eye.

11. The device of claim 1, wherein the liquid crystal is contained within a combination of the first lens body, the second lens body, and the adhesive.

\* \* \* \* \*